Jan. 10, 1950     C. R. BUSCH     2,493,913
BRAKE BEAM
Filed Sept. 18, 1946     6 Sheets-Sheet 1
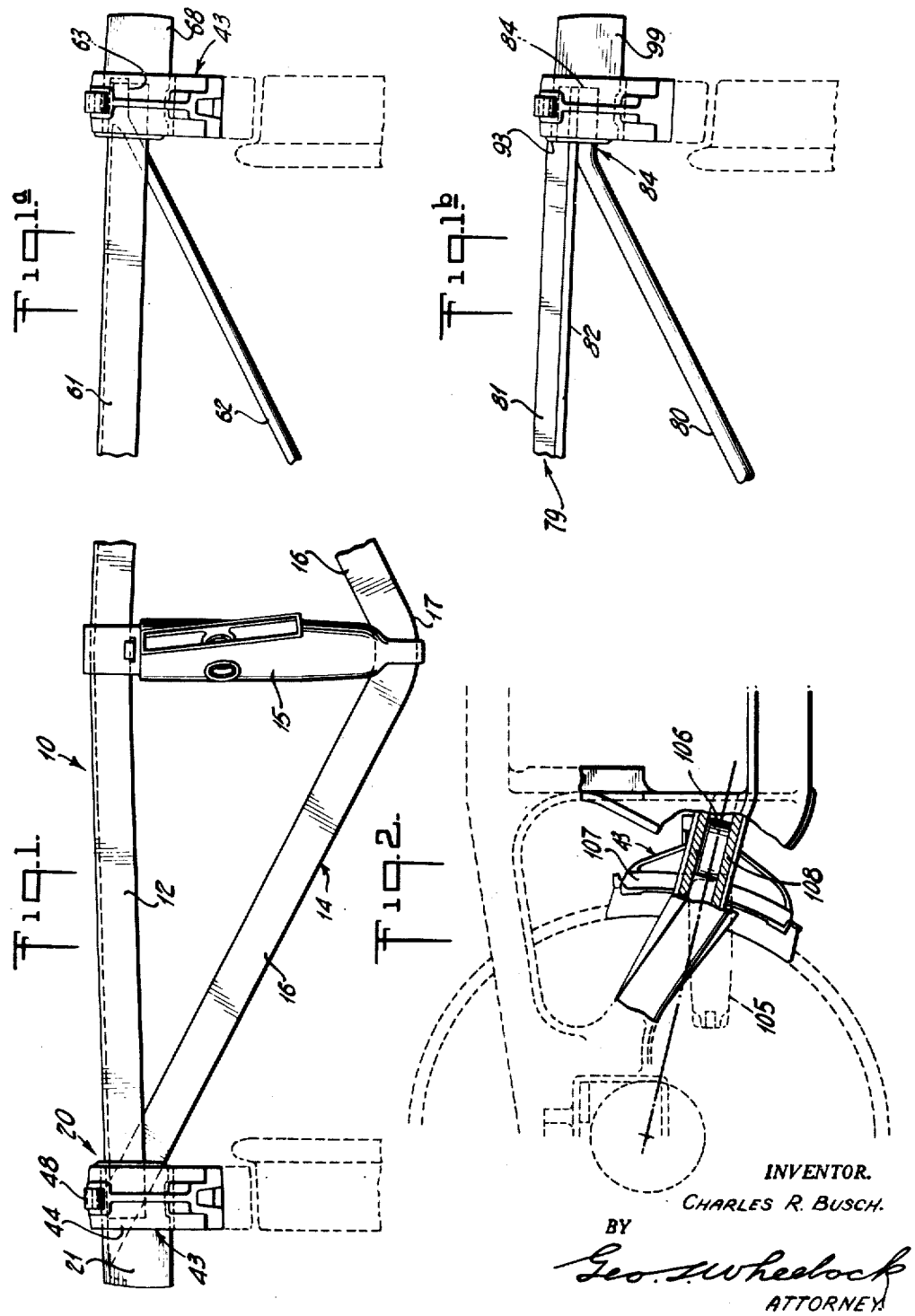
INVENTOR.
CHARLES R. BUSCH.
BY
Geo. T. Wheelock
ATTORNEY

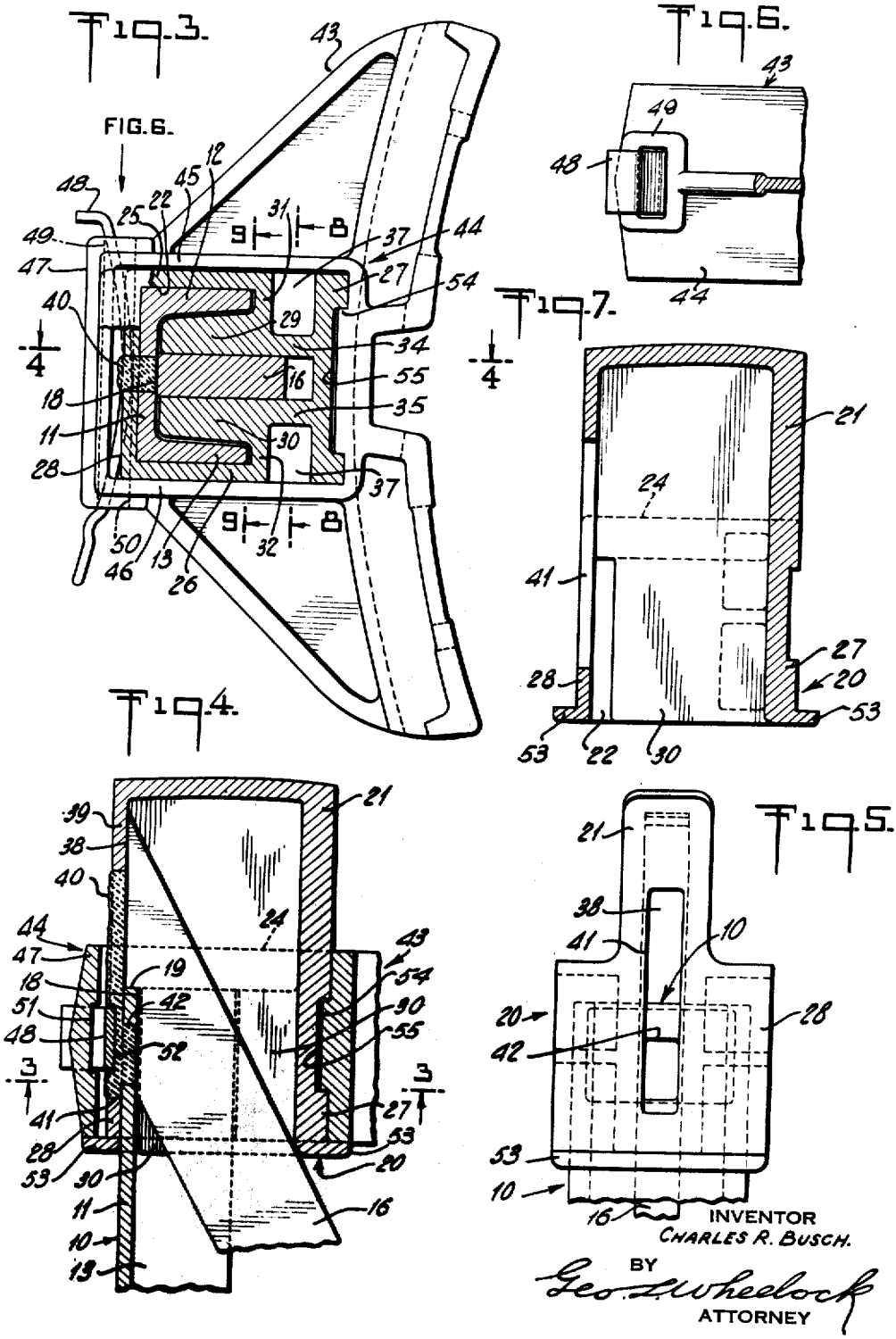

Jan. 10, 1950  C. R. BUSCH  2,493,913
BRAKE BEAM
Filed Sept. 18, 1946  6 Sheets-Sheet 3
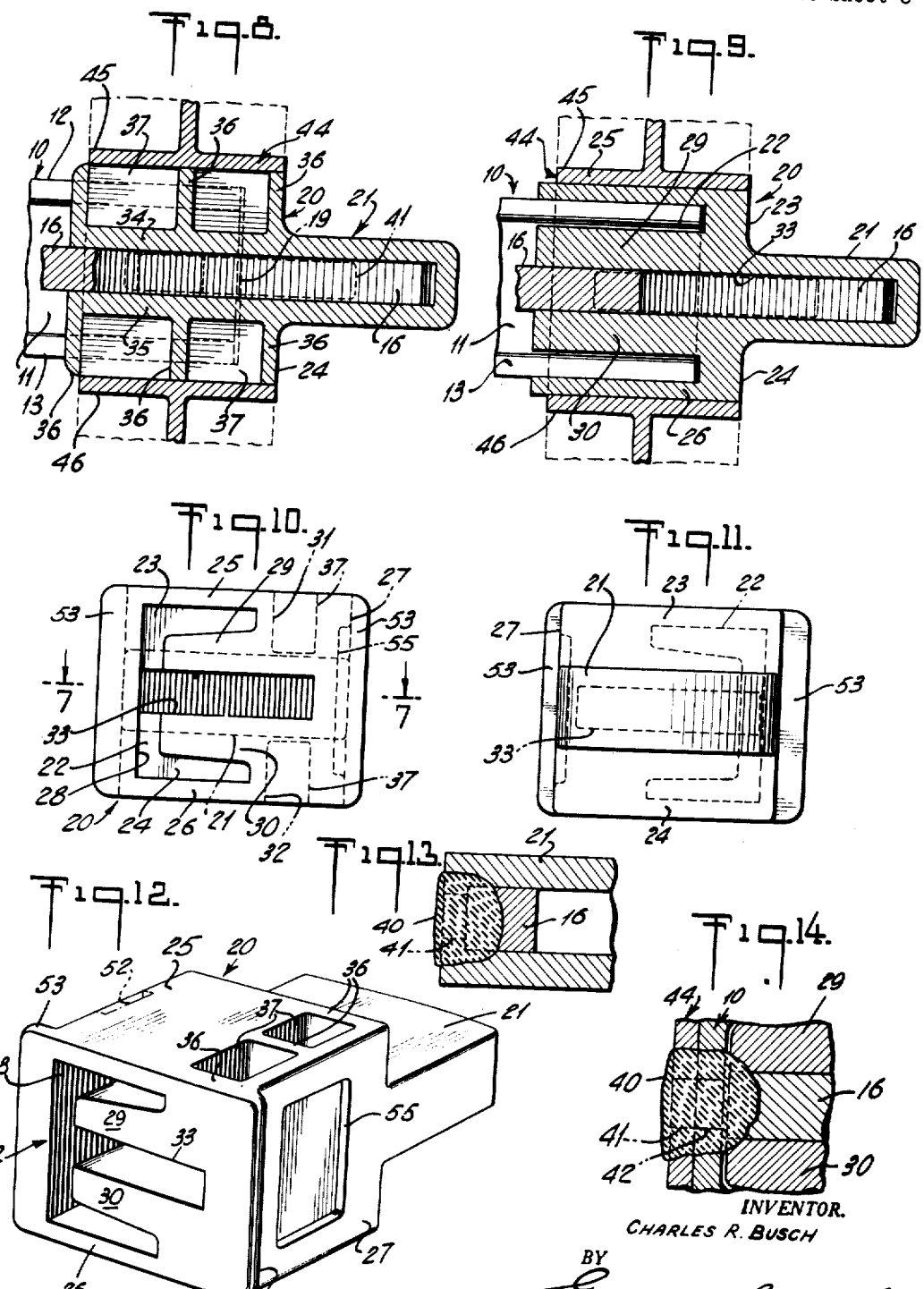
INVENTOR.
CHARLES R. BUSCH
BY
Geo. L. Wheelock
ATTORNEY.

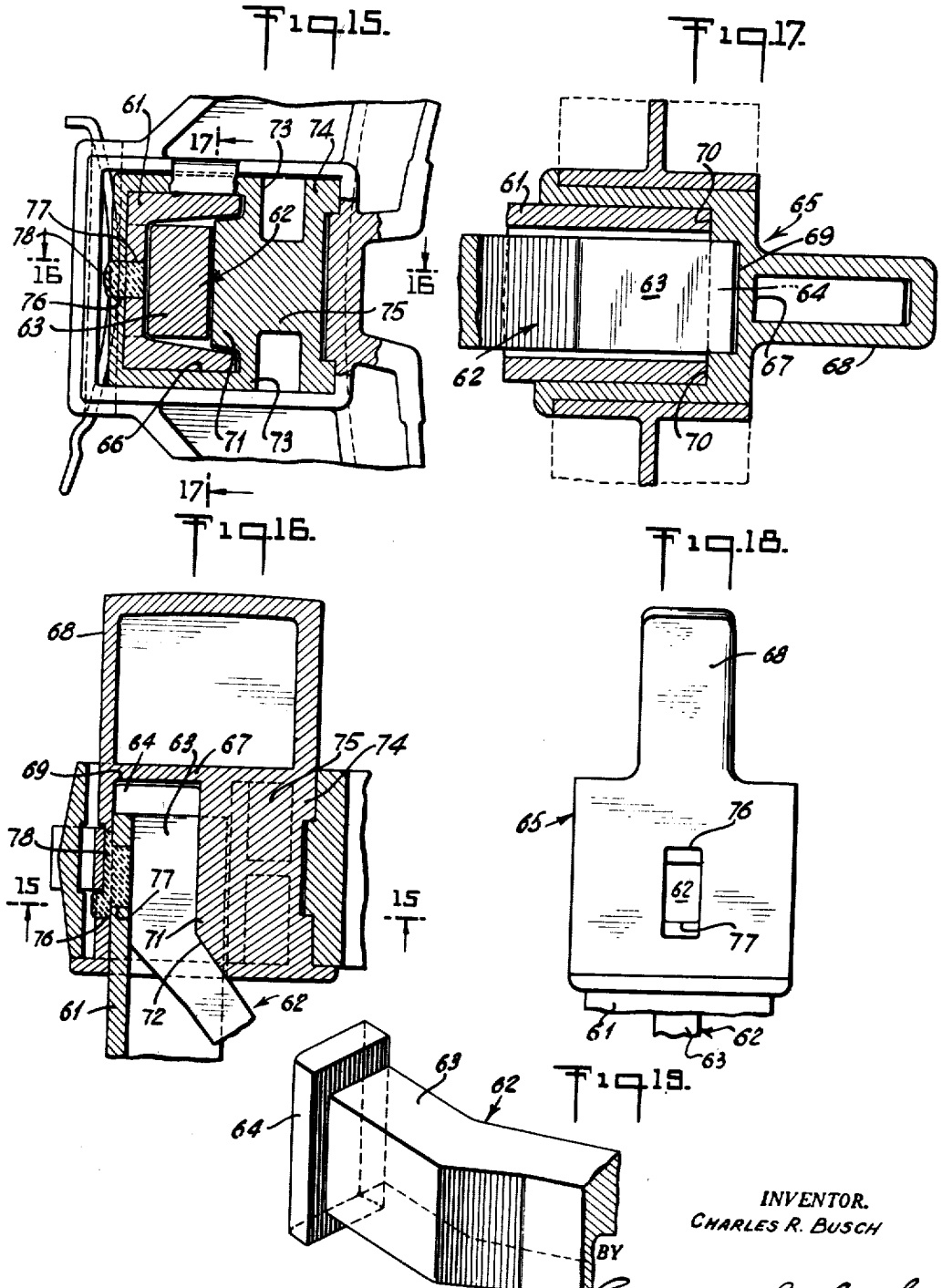

Jan. 10, 1950 C. R. BUSCH 2,493,913
BRAKE BEAM

Filed Sept. 18, 1946 6 Sheets-Sheet 5

INVENTOR.
CHARLES R. BUSCH.
BY Geo. L. Wheelock
ATTORNEY

Jan. 10, 1950     C. R. BUSCH     2,493,913
BRAKE BEAM
Filed Sept. 18, 1946     6 Sheets-Sheet 6
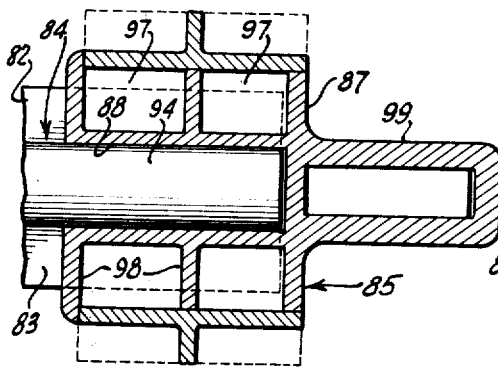
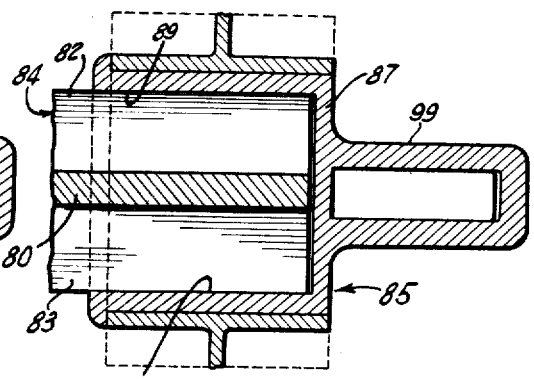
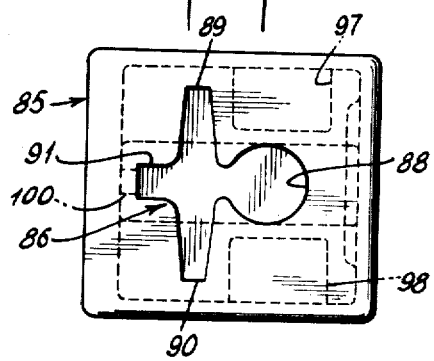
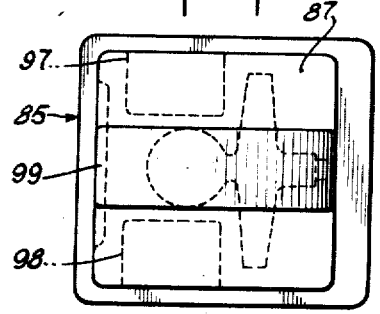
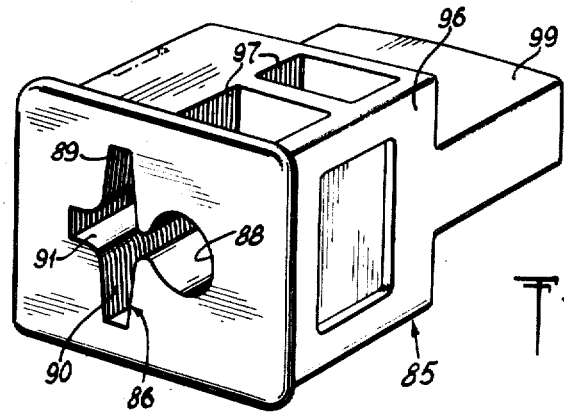
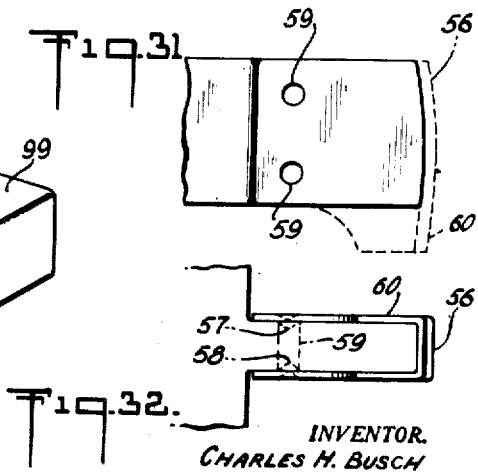
INVENTOR.
CHARLES H. BUSCH
BY
Geo. L. Wheelock
ATTORNEY Patented Jan. 10, 1950

2,493,913

UNITED STATES PATENT OFFICE 2,493,913

BRAKE BEAM

Charles R. Busch, Orange, N. J., assignor to Buffalo Brake Beam Company, New York, N. Y., a corporation of New York Application September 18, 1946, Serial No. 697,680

28 Claims. (Cl. 188—223.1)

The present invention relates more particularly to railway car brake beams preferably of truss type supported from and guided on the side members of a car truck by guides thereon which are inclined downwardly away from the wheel axle, such inclination preferably more or less coinciding with the axis of the wheels, although in some aspects the invention may apply to brake beams which are supported by hangers.

An object of this invention is to provide truss brake beams which preferably make use of commercially rolled bars of steel or any suitable metal of various sections wherein the truss is maintained by means of cast or forged truss locks or housings, the compression and tension members being preferably interlocked although they may be united in one piece if desired, and a solid truss being obtained preferably by welding the truss locks and the said members together to provide a strong and efficient truss-locked brake beam, adapted to be guided on the side members of a car truck or swung from hangers if so desired.

The present invention also provides for the use of a removable brake-beam head securely mounted on the truss locks so that a lost, broken or worn out brake shoe will not ruin the brake head as sometimes happens even on the first application of the brake, and unless the brake head is removable and easily replaced delays to transportation will result.

Many other objects of the invention will be covered in the following description to which reference should be had in connection with the accompanying drawings illustrating some forms of the invention, and wherein—

Fig. 1 is a plan view of one end of similar end portions of the preferred form of the brake beam, partly in broken lines;

Fig. 1a is a rather similar plan view of a modification of the brake beam;

Fig. 1b is a plan similar to Fig. 1a and showing another modification;

Fig. 2 is a side elevation of members of a car truck broken away, and partly in full and in broken lines, showing a modification of either of Figs. 1, 1a and 1b wherein the brake beam is horizontal and the guide member of the beam is inclined relatively to the horizontal;

Fig. 3 is a vertical transverse section of the preferred form on line 3—3, Fig. 4, the brake head being shown in elevation;

Fig. 4 is a horizontal section on line 4—4, Fig. 3;

Fig. 5 is a broken rear elevation of an end portion of the beam of Figs. 1, 3 and 4 before welding, parts in broken lines;

Fig. 6 is a broken top plan of the back portion of the brake head shown in Fig. 3;

Fig. 7 is a longitudinal section of the truss lock and its extended guide, on line 7—7, Fig. 10;

Fig. 8 is a vertical section on line 8—8, Fig. 3, partly in elevation and parts in broken lines;

Fig. 9 is a vertical section on line 9—9, Fig. 3, partly in elevation and parts in broken lines;

Fig. 10 is an elevation of the truss lock as viewed toward its inner end;

Fig. 11 is an elevation thereof as viewed toward the opposite end;

Fig. 12 is a perspective view of the truss lock;

Fig. 13 is a section generally showing certain parts after welding;

Fig. 14 is a section along another part of the weld;

Fig. 15 is a section on line 15—15, Fig. 16, parts of the brake head in elevation and broken away, and appertaining to the modification in Fig. 1a;

Fig. 16 is a section on line 16—16, Fig. 15;

Fig. 17 is a vertical section on line 17—17, Fig. 15;

Fig. 18 is a broken rear elevation of an end portion of the beam of Figs. 1a, 15 and 16 before welding;

Fig. 19 is a broken perspective view of one end of the tension member of Fig. 1;

Fig. 26 is a section on line 26—26, Fig. 23, partly in elevation and broken away;

Fig. 27 is a section on line 27—27, Fig. 23;

Fig. 28 is an elevation of the inner end of the truss lock of Figs. 23 and 24, partly in broken lines;

Fig. 29 is an elevation of the opposite end, partly in broken lines;

Fig. 30 is a perspective view of the same truss lock;

Fig. 31 is a plan view of a broken away supporting portion of any one of the illustrated brake beams, showing a protecting wear member in broken lines applied thereto; and Fig. 32 is a broken front elevation of the same parts, partly in broken lines.

Figure 20:
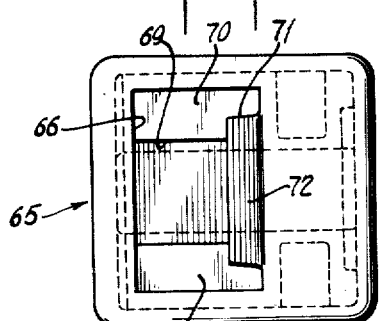
Fig. 20 is an elevation of the inner end of the truss lock of Figs. 15 and 16, parts in broken lines.
Figure 21:
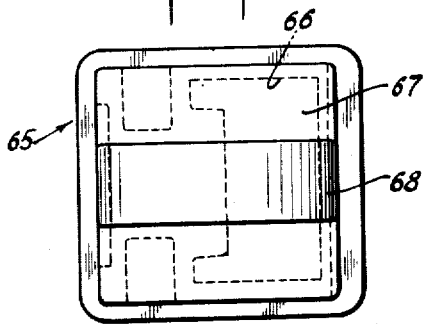
Fig. 21 is an elevation of the opposite end, parts in broken lines.
Figure 23:
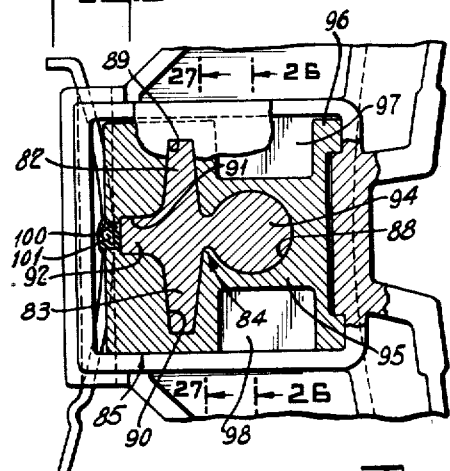
Fig. 23 is a section on line 23—23, Fig. 24, parts in elevation and broken away, and appertaining to the modified brake beam in Fig. 1b.
Figure 22:
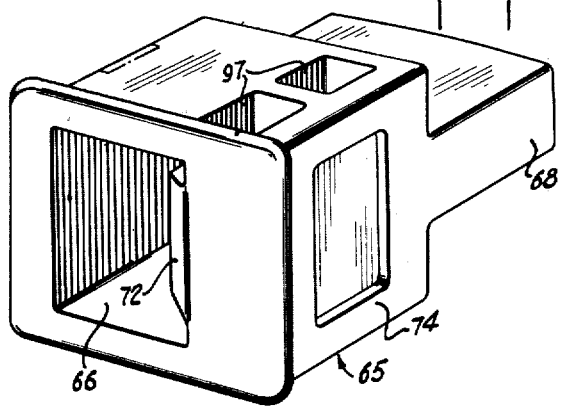
Fig. 22 is a perspective view of the same truss lock.

Referring to Figs. 3, 4, 8 and 9 the parts which make up a truss-locked brake beam according to Fig. 1 are shown assembled and a description of these figures now follows, Fig. 1 showing as much of one end portion of the beam as is needed for understanding the entire beam which is to be of the same construction at each end.

Compression member or bar 1 has any desirable cross section but is shown as a channel with a back web 11 and an upper web 12 and a lower web 13 as flanges extending forwardly from the back web. Tension member or bar 14 is shown as a wide flat bar of rectangular section which lies edgewise to compression member 10, with a strut 15 between the two members, which are assembled at each end of the beam with other elements thereof in a similar manner, so that the construction at one end only of the beam needs to be described as it applies to each end.

Preferably the tension member 14 is provided with similar divergent halves 16, 16, which extend toward the compression member from a bend 17 at its mid-length and in the general form of a wide V, the bend being applied to one end of the strut 15 which is applied at its other end to the mid-length of the compression member.

Near its end the tension member has a straight back edge 18 (Fig. 4) which is seated against the intermediate web 11 of the compression member and is parallel with the latter, the tension member here crossing the forward webs 12, 13, and being so positioned that it lies in a plane halfway between the webs 12, 13.

The back edge 18 extends to a rearward shoulder 19 of the tension member and engages with the transverse terminal edge of the web 11. Such a shoulder 19 near each end of the tension member provides the same with two shoulders which face toward the compression member and enables the compression member to be forced into a slight rearward bow to pre-camber it and to be snap engaged between the shoulders so that the shoulders abut the terminals of the compression member and hold the two members assembled as a unit capable of being handled. The result obtained by such pre-cambering of the compression member is shown in Fig. 1, and is rather similar to what is disclosed in application Serial No. 669,391, filed May 13, 1946, now Patent No. 2,490,205.

Around the connected end portions of tension member 14 and pre-cambered compression member 10 there is snugly aplied a housing 20 which constitutes a truss lock that is shown in greater detail in Figs. 5, 7, 10, 11 and 12. The truss lock 20 is preferably provided with an outer end extension 21 to support and guide the beam on a truck side frame, and with such extension the whole may be cast or forged as a unit. However made the truss lock body is preferred to be of block form and of substantially rectangular section across both dimensions thereof so that its outside surfaces are flat.

Truss lock 20 is open at its inner end to provide a socket 22 which extends to the walls 23, 24, at its outer end and which support the shell-like guiding extension 21, which preferably has flat upper and lower surfaces and is located midway of the upper and lower walls 25, 26, of the lock with said surfaces parallel with walls 25, 26, so that the central horizontal plane of the extension coincides with that of the lock. The lock also has a front wall 27 and a back wall 28, on which front wall the tension member bears.

Socket 22 of the truss lock has the approximate cross section of the channeled compression member 10 so as to more or less snugly receive the end of said member which is inserted into the socket until its terminal edge is against the outer end walls 23, 24 as shown in Fig. 9, the forwardly extending recesses of the socket being defined by the upper and lower walls 25, 26 and by interior ledges or tongue-like walls 29, 30, of the truss lock as shown in Fig. 3.

These interior walls 29, 30, are preferably rectangular in shape and extend horizontally parallel with the upper and lower walls 25, 26, of the truss lock respectively from end walls 23, 24, and rearwardly from interior vertical walls 31, 32, of the lock.

Interior horizontal walls 29, 30, are sufficiently spaced apart to snugly receive between them an end portion of one half 16 of the tension member, said walls extending sufficiently rearward in the truss lock so that the back edge 18 of the tension member can engage with the back web of the compression member 10. At the outer end of the said edge 18 of the tension member the space between the interior horizontal walls 29, 30, terminates in a slot 33 between the end walls 23, 24, and extends rearwardly to the back wall 28 of the truss lock, as shown in Figs. 7 and 10. Interior walls 29, 30 supporting the ends of the compression and tension members are additionally supported forwardly thereof, as shown in Figs. 3 and 8, by horizontal walls 34, 35, which have the same spacial relation as said supporting walls 29, 30, and extend rearwardly from front wall 27 of the truss lock. Defined by the front wall 27 and walls 31, 32 and 34, 35 and by vertical transverse webs 36 connecting the walls 31, 32 with walls 34, 35 are cavities 37 in the top and bottom of the truss lock together forming a cellular construction shown in Figs. 3, 8 and 12, which while strongly reinforcing the truss lock reduces its otherwise necessitated weight considering that it should be of sufficient size to serve its purposes.

From its shoulder 19, outwardly the terminal portion of the part 16 of the tension member has its back edge 38 straight but on a bias with respect to its front edge, forming a tapered end which extends through the slot 33 and into the hollow or shell-like guide extension 21 of the truss lock and in engagement with the mutually facing surfaces of the extension, and said back edge 38 has direct contact throughout its length with the inner surface of the back wall 39 of said extension as shown in Fig. 4.

It will be seen that the described truss lock can be reversed for use at either end of the brake beam as it is of similar construction both above and below its central plane.

While the described assembled elements at each end of the truss brake beam are constructed for obtaining great strength and durability in the beam and are compactly assembled, it is preferred to unite them solidly together by suitable welds, which by way of example are generally indicated in Figs. 13 and 14 and more particularly shown in Figs. 3 and 4. In Fig. 3 the weld 40 is made through a slot 41 in the back wall of lock extension 21. In Fig. 14 the same weld is continued in the same slot 41 in the truss lock and is also made in slot 42 of compression member 10. Each slot extends longitudinally of the brake beam and slot is shown in detail in Figs. 4, 5 and 7, from which it will be seen that the slot 41 in the truss lock and its extension is much longer than the slot 42 in the compression member. Such openings in the form of slots should register with each other to receive the weld.

By means of any suitable welding method molten metal is flowed into the slot 41 of the truss lock and into registering slot 42 of the compression member and when both slots are being filled up the flowing metal will penetrate to and more or less around the adjacent portions of the tension member and the horizontal walls 29, 30, with which both of said members engage, the penetration by the weld being represented in a general way by Fig. 14. Also, the flowing metal will penetrate into the upper and lower portions of the truss lock extension 21 and solidly tie them to the terminal portion of the tension member, with a weld such as shown in a general way by Fig. 13.

The tongues or walls 29 being at both ends of the brake beam not only strongly brace the tension member to relieve it of vertical shocks, strains and twisting but they will act as plugs to prevent the overflow of the molten metal and to greatly strengthen the weld. Furthermore, the notching of the tension member to provide abutment or shoulder 19 serves as a safe-guard should a bad weld be made inadvertently. It will therefore be seen that the compression member, tension member and truss locks are firmly and securely bound together into a solid truss, which is especially adapted for an end guided brake beam.

Brake head 43, Figs. 1, 3 and 4, is preferably of symmetrical shape and is reversible so that it may be applied to either end of the brake beam. It is preferably provided with a rectangular back collar 44 standing at a right angle with the face portion of the head and adapted to be applied onto truss lock 20. The opening in the collar vertically is of such dimension that when the head is mounted on the truss lock the upper and lower bars 45, 46, of the collar fit on the top and bottom of the lock, whereas the back bar 47 of the collar is preferably spaced slightly away from the back of the lock to permit a slight breathing movement of the head back and forth. A bowed spring key 48 passing through eyes 49, 50 of the collar and bearing at its middle portion on the back of the truss lock serves as a shock absorber for the brake head; all as more fully set forth in application Serial No. 652,337 filed March 6, 1946, now Patent No. 2,490,204. Opposed vertical grooves 51, 52, respectively in the collar and the back of the truss lock guide the spring key to its locking position.

Beam guiding extension 21 on the truss lock is shown as having a cross section which permits the brake head collar to be slipped along it until the head is mounted on the lock, the brake head being centered in braking position by contacting with abutments 53 on the inner end of the truss lock and by a boss 54 on the head which enters a depression 55 in the front wall of the lock when the head is pushed back to secure the head to the lock by the key 48.

The guide 21 may be hardened to take the wear if any, or it may be cast with a forwardly projecting nose to give it an extended bearing on the truck side member should a brake head with only a pair of back jaws be used, such head to be pushed directly back onto the truss lock and secured by a locking key. If the guide 21 is to be hardened it can be chromium plated or flame hardened.

At all events if, as shown, the guide 21 has but the one cross section throughout its length, is not hardened, and must be protected against wear, a somewhat springy wear member 56 of U-shape, shown in Figs. 31 and 32, and composed of a relatively harder metal than the guide can be snapped thereon. The wear member is shown as provided with mutual presented teats 57, 58 which will spring into the ends of perforations 59 when the wear member is pressed onto the end of the guide. Such wear member, or protecting member for the guide as it gets very little if any wear of any consequence, will have a forwardly extending nose 60.

An important advantage gained by the pre-cambering of the compression member is that, as shown in Fig. 1, the truss lock such as 20 when mounted on both ends of the united compression and tension members will have an inward angular position relatively to the longitudinal axis of the truss brake beam—and likewise the brake heads such as 43—with the result that the brake shoes on the heads will have a corresponding angular position and also corresponding to the bevel of the car wheels so that even wear of the shoes will take place.

Figs. 15 to 22 in connection with Fig. 1a show a modified construction of truss brake beam possessing many advantages in common with the beam already described. The compression member 61 may have the same channel cross section as the other one, while the tension member 62 is shown as having an oblong cross section with the longer dimension vertical. The tension member has its terminal portion 63 bent outwardly as in Fig. 19 so that it will lie flat against the back web of the compression member 61, the portion 63 being upset upwardly, rearwardly and downwardly to provide triple shoulders or abutments 64, against which at both ends of the tension member the terminals of the webs of the pre-cambered compression member 61 are sprung to unite the two members as a unit. When so united the terminal portion 63 will substantially occupy the space between the upper and lower webs of the compression member.

Truss lock 65 is provided with a socket 66 which is open at the inner end of the lock to receive the united ends of the compression and tension members, the tension member extending to a closed vertical wall 67 which separates the lock from guiding extension 68 from said wall. As more clearly shown in Fig. 17 the upper and lower parts of the wall 67 are thickened to provide a sub-socket 69 receiving the upset end 64 of the tension member and shoulders 70 against which abut the end edges of the two forward webs of the compression member.

Forwardly the socket 66 is defined by a rearward boss or prominence 71 having a sloping or beveled end surface 72, against which boss rests the terminal portion 63 of the tension member, while the adjacent front surface of such member bears on the sloping surface 72. In such manner the push on the tension member is partly imposed on the sloping surface, its main thrust being upon the compression member at shoulders 64. Forwardly the boss 71 is strongly supported by walls 73 which are parallel with the front wall 74 of the truss lock and by a thick horizontal neck 75 which connects the walls 73, 74.

As in the described modification the tension member does not extend into the guide 68, the slot 76 in the truss lock is only back of the end of the compression member 61, the slot 77 in the compression member being in register with slot 76. The molten welding metal flowed into the slots 76, 77, will therefore produce a weld 78 so that the compression and tension members and the truss lock will be rigidly united into a substantial and solid truss.

In all other respects than described the modified brake beam and truss locks have the same features as those first described herein.

The other modification shown in Figs. 1b and 23 to 30 inclusive relates to a truss brake beam of the type in which the compression member 79 and tension member 80 were originally made in well known manner from a slitted bar of cruciform cross section having a round forward portion which provides for forming the tension member when it is forced into its shape away from the back portion of the bar which is for the compression member. The back portion of the bar will then have a back web 81 and vertical webs 82, 83, and the two portions will be connected at each end by an integral union 84 of cruciform cross section. To camber the compression member 79 it is prebowed slightly outwardly and the strut (not shown) is forced into place by pressure and then attached at its ends to the compression and tension members, the preferred strut being shown in Fig. 1 and is similar to the one covered by U. S. Patent No. 2,170,114.

Figure 24:
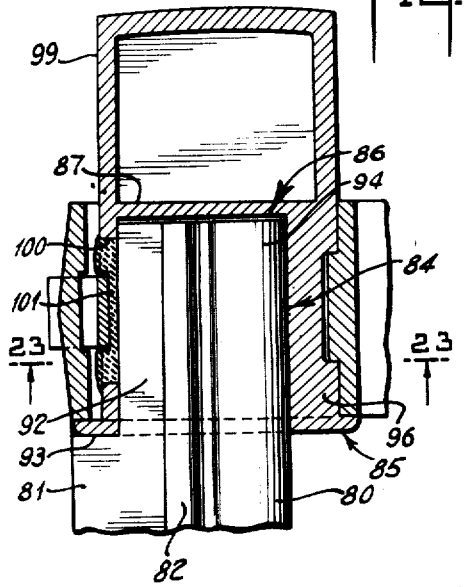
Fig. 24 is a broken away horizontal central section of Fig. 23 partly in elevation.
Figure 25:
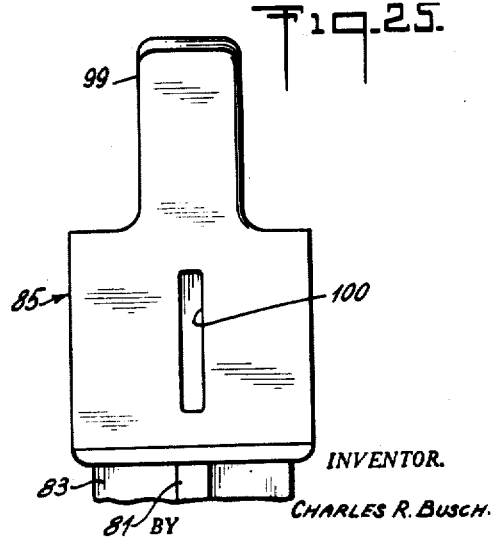
Fig. 25 is a broken rear view of an end portion of the same brake beam before welding.

Inasmuch as the union or connection 84 for the ends of the compression and tension members in such type of truss has been found to require more or less protection because of occasional failures thereof in securely holding together the two members, this modification of the present invention makes use of a truss lock 85 for each end of the brake beam. To that end the truss lock is provided with a socket 86 which is open at the inner end of the lock and extends to closed end 87 at the outer end of the lock. Socket 86 has the same cruciform cross section as the union 84 which is entered thereinto, the socket having a round forward recess 88, vertical recesses 89, 90, and a rear recess 91, which latter does not extend as far back as the width of the back web 81 of the compression member as it is made just wide enough to receive the width of a reduced portion 92 of web 81. By thus forming the reduced portion 92 a rearward shoulder or abutment 93 is provided which, as shown in Fig. 24, faces toward the end of the geam and engages with the back of the truss lock 85, and limits the position of the lock when forced onto the union 84. Rounded front portion 94 of the union 84 bears forwardly on a strong horizontal neck-like member 95 extending from the front wall 96 of the truss lock, while above and below the portion 94 the lock has resistant cellular formations 97, 98, respectively, which occupy about the front half of the lock. Around the portions 82, 83 and 92 of such union the truss lock is solid.

Beyond the union 84 there is provided on the closed outer end 87 of the lock an extension 99 for supporting and guiding the brake beam when so desired. In this particular modification the truss lock casting or forging has a slot 100 in its back wall which permits of binding the lock to the union 84 by a weld 101 which, applied to both ends of the break beam, unites the members in a solid truss.

In all of the described brake beams the general construction throughout is basically the same for accomplishing the principal functions and advantages, the main differences being in the constructions of the truss lock bodies, but which preferably however have corresponding exterior features for performing the same functions as each other, each truss lock being so shaped as to receive similar brake heads such as previously described. Furthermore, the different brake beams, if and when welded in the ways described, will have a weld at each end made by the molten metal which is freely flowed into the weld-receiving openings in the truss locks and which weld solidly unites the involved parts, the molten metal permeating and entering into any interstices that may be between them to such extent, and to a more or less varying extent, at that, that the weld can only be indicated in a general manner more or less as in Figs. 13 and 14.

In Fig. 2 another modification is shown wherein the truss 105 of the brake beam lies horizontal substantially parallel with the track, and the guide extension 106 is on a bias with respect to the truss, the brake head 107 being on a backward slant from its lower end so that the biased plane of the extension bisects the longitudinal plane of the head. Side frame guides 108 are inclined to receive the extension 107 and support and guide the brake beam. Such adaptation applies to either of the described brake beam constructions.

It will be obvious to those skilled in the art that the invention and various features thereof are subject to more or less changes which can be made therein without departing from the spirit of the invention and its scope as defined by the appended claims.

What I claim is:

1. A truss brake beam, including individually separate compression and tension members, truss locks surrounding terminal portions of the members and fixing the members together and adapted for the mounting of brake heads thereon, and beam guiding means rigid with the truss locks and located between the upper and lower surfaces of the locks, and extending outwardly in line with the longitudinal axis of the brake beam at the ends thereof, such means enclosing the terminal portions of the tension member which are solely extended thereinto beyond the terminals of the compression member.

2. A truss brake beam, including compression and tension members connected together at their ends, housings around the connected ends of the members, and in each housing a pair of mutually facing spaced walls between and by which the ends of the tension member are engaged and the outsides of which walls are engaged by the compression member.

3. A truss brake beam according to claim 2, wherein the two members are individually separate from each other in their entirety, the housings constitute truss locks fixing the members together positively, and the walls extend rearwardly from the front walls of the locks horizontally and to opposite sides of the middle plane of the vertical thickness of the truss locks, the walls extending rearwardly close to the compression member.

4. A truss brake beam according to claim 2, wherein the compression member is of channel type and is an entirely separate member from the tension member, the housings constitute truss locks fixing the members together and provided with sockets outside of and back of the mutually facing walls, and each socket of substantially the same shape as a cross section of the compression member and receiving the ends thereof.

5. A truss brake beam, including a compression member, a tension member bent in the middle and having divergent halves away from the bend, and each half extending substantially at the same slant as the other and continuously at one slant for the full length thereof to its terminal, and the terminals crossing the ends of the compression member at such slant and extending beyond the compression member, and truss locks around the crossings of the members and having beam guiding extensions receiving the thus continuously slanted extended ends of the tension member.

6. A truss brake beam, including compression and tension members connected together at their ends, truss locks around the connected ends of the members and each truss lock having interior substantially horizontal walls spaced apart sufficiently to engage across the end of the tension member positioned between them, such walls also separated by spaces from the upper and lower outer walls of the lock, and the compression member engaged in said spaces, the middle horizontal plane of the locks extending between the interior horizontal walls and such horizontal walls projected rearwardly from the front walls of the truss locks.

7. A truss lock adapted for receiving an end of the truss of a brake beam, comprising a lock body proper substantially rectangular in shape and of substantially the same thickness vertically and horizontally, such body having a beam guiding extension from one end extending in the middle horizontal plane of the lock, and inwardly of the extension the front of the truss lock having a flat surface interruption adapted to engage with a brake head when mounted on the truss lock and the remainder of the front being flat.

8. A truss lock according to claim 7, wherein the lock is provided with brake head abutment means at the end remote from the beam guiding extension thereof and with a longitudinal slot extending in its back between the abutment means and the extension adapted to receive a weld.

9. A truss lock having a rear socket of channel form adapted to receive the end of a channel compression member of a truss brake beam, the lock having interior substantially parallel spaced apart walls projected rearwardly from the front wall of the lock at approximately the mid-height thereof, outer surfaces of the spaced walls in conjunction with the upper, lower and back interior surfaces of the lock defining the socket, and the spaced apart walls adapted to engage between them the end of a tension member of such a brake beam.

10. A truss lock according to claim 9, wherein the back wall of the lock is provided with means adapted for assuring the rigid securement of the lock to such a compression member.

11. A truss lock according to claim 9, wherein the back wall of the lock is provided with a longitudinal slot adapted for the rigid securement of the lock to such a compression member by welding.

12. A truss lock according to claim 9, wherein the lock has a hollow longitudinal extension adapted to guide the end of such a beam, and is provided with a slot which runs along the extension.

13. A truss lock according to claim 9, wherein the spaced apart walls are connected with the upper and lower walls of the lock by reinforcing means.

14. A truss brake beam including compression and tension members connected together at their ends, the compression member being of channel section, truss locks around the connected ends of the members, and in each truss lock spaced transverse grooves substantially parallel with the backs of the locks and receiving the edges of the compression member, the grooves form at opposite sides of rigid means projected rearwardly from the front walls of the locks and such means located between the edges of the compression member and engaging therewith.

15. A truss brake beam, comprising a channel-section compression member with a back web and spaced webs at angles thereto, a tension member with its end portions interlocked with the ends of the back web of the compression member and between the spaced webs, and truss locks around the points of interlock, the locks each having an intermediate prominence projected rearwardly from the front wall and each end portion of the tension member seated against the prominence.

16. A truss brake beam according to claim 15, wherein the truss locks are each provided with substantially parallel longitudinal grooves at opposite sides of the prominences and the spaced webs of the compression member seated in the grooves.

17. A truss brake beam according to claim 15, wherein the terminals of the tension member are upset rearwardly, upwardly and downwardly and engaged with the ends of the three webs of the compression member.

18. A truss brake beam according to claim 15, wherein each truss lock is provided with a wall at its outer end against which abut the terminals of the tension member.

19. A truss brake beam according to claim 15, wherein the truss locks are provided with beam guiding extensions projected from end walls of the locks, and adapted for guiding the brake beam on side members of car trucks.

20. A truss brake beam, comprising compression and tension members connected at the ends, the end connections formed by end portions of cruciform cross sectional integral with the two members, the back of the compression member having a longitudinal web terminating in narrowed webs on the end portions, and truss locks around the end portions including the narrowed webs.

21. A truss brake beam according to claim 20, wherein the longitudinal back web of the compression member has terminal shoulders engaged with the inner ends of the truss locks.

22. A truss brake beam according to claim 20, wherein the outer ends of the truss locks are provided with vertical walls outside of the end portions connecting the two members, the locks having longitudinal extensions in line with the longitudinal axis of the brake beam and adapted to guide the beam on side members of a car truck, and their upper and lower surfaces lying in substantially parallel planes intermediate of the corresponding surfaces of the truss locks.

23. A truss brake beam, comprising united compression and tension members and their united ends providing longitudinal portions of the brake beam, truss locks around the longitudinal end portions and whereof the bodies proper thereof are in the general form of blocks having substantially flat surfaces at the encompassing sides of each block, and adapting the locks for the mounting of brake heads thereon, the truss locks having sockets into which the end portions are seated, a strut between the two members, the front walls of the bodies of the truss locks having surface interruptions at their outward surfaces offset therefrom, and the lock bodies provided with fabricated cellular structures intermediate of the sockets and the front walls, and brake heads mounted upon the truss locks and having rear surface interruptions the reverse of aforesaid surface interruptions and interlocked therewith.

24. A truss brake beam, comprising united compression and tension members and their united ends providing longitudinal portions of the brake beam, truss locks around the longitudinal end portions and whereof the bodies proper thereof are in the general form of blocks having substantially flat surfaces at the encompassing sides of each block, and adapting the locks for the mounting of brake heads thereon, the truss locks having sockets into which the end portions are seated, a strut between the two members, the walls of the truss locks back of the sockets provided with through openings communicating with the sockets, and welding means through the openings solidly uniting the end portions and truss locks, whereby all parts of the thus composed brake beam structure are stabilized.

25. A truss brake beam according to claim 24, and also including brake heads mounted on the truss locks and beam supporting and guiding elements integral with the locks and extending in opposite directions away from the brake heads.

26. A truss brake beam according to claim 24, wherein the compression member is at least provided with a substantially vertical web extending along the end portions and a substantially horizontal web standing at an angle to aforesaid web and also extending along the end portions, and substantially flat beam supporting and guiding elements integral with the outward ends of the truss locks, such elements located approximately midway of the substantially flat upper and lower surfaces of the locks in alignment with the longitudinal axis of the brake beam.

27. A truss brake beam, including separate compression and tension members, truss locks fixing the ends of the members together and having longitudinal extensions constituting means for guiding the beam on side members of a car truck, the truss locks having openings adjoining the ends of the compression and tension members, and the compression member having openings registered with the aforesaid openings, the ends of the tension member extending into the truss lock extensions, and the openings in the truss locks being in the shape of longitudinal slots extending into the extensions of the locks, where their outer ends are opposite the extended ends of the tension member, and the openings in the compression member registered with the inner ends of the slots, and through the slots and compression member openings uniting the truss locks, the extensions thereof and such members by welding.

28. A truss lock in the form of a housing adapted for receiving an end of a truss of a brake beam, the lock being in the shape of a substantially rectangular block, the outer surfaces of the lock adapted to receive a brake head, and the lock comprising a socket the wall of which is continuous to completely surround such end, and a slot in the back of the lock communicating with the socket, the slot adapted to receive a weld, and the lock provided with a hollow end extension adapted for guiding a brake beam and the slot in the lock running along such extension.

CHARLES R. BUSCH.

REFERENCES CITED

The following references are of record in the file of this patent:

UNITED STATES PATENTS

| Number | Name | Date |
|---|---|---|
| 766,362 | Lamont | Aug. 2, 1904 |
| 884,445 | Williams, Jr. | Aug. 14, 1908 |
| 1,022,440 | Perry et al. | Apr. 9, 1912 |
| 2,074,667 | Paterson | Mar. 23, 1937 |
| 2,170,122 | Busch | Aug. 22, 1939 |
| 2,348,092 | Parke | May 2, 1944 |
| 2,356,720 | Aurien et al. | Aug. 22, 1944 |
| 2,398,917 | Busch | Apr. 23, 1946 |
| 2,398,918 | Busch | Apr. 23, 1946 |